(12) United States Patent
Gunton

(10) Patent No.: US 6,188,198 B1
(45) Date of Patent: Feb. 13, 2001

(54) APERTURE CLOSURES

(76) Inventor: Bruce Stanley Gunton, 11 Asphodel, Badgers Bank Road, Sutton Coldfield, West Midlands, B74 4ES (GB)

(*) Notice: Under 35 U.S.C. 154(b), the term of this patent shall be extended for 0 days.

(21) Appl. No.: 09/377,370

(22) Filed: Aug. 18, 1999

(30) Foreign Application Priority Data

Aug. 20, 1998 (GB) .................................................. 9818070

(51) Int. Cl.$^7$ .................................................. H02J 7/00
(52) U.S. Cl. .................................................. 320/117; 320/116
(58) Field of Search .................................. 320/117, 116; 160/188, 189, 199; 340/825.22, 825.12; 49/26, 27, 30, 340

(56) References Cited

U.S. PATENT DOCUMENTS

| 4,750,295 | 6/1988 | Court et al. ............................. 49/340 |
| 5,637,979 | * 6/1997 | Tamai et al. ............................. 320/116 |
| 5,698,073 | * 12/1997 | Vincenzi ................................ 160/188 |
| 5,793,300 | * 8/1998 | Suman et al. ......................... 340/825.22 |
| 5,803,149 | * 9/1998 | Halley et al. ........................... 160/201 |

* cited by examiner

*Primary Examiner*—Peter S. Wong
*Assistant Examiner*—Lawrence Luk
(74) *Attorney, Agent, or Firm*—Smith-Hill and Bedell

(57) ABSTRACT

A sliding door mechanism controls a door 10 in the form of a series of horizontal slats articulated to the slats above and below to move from a closed position in a vertical plane, along between tracks 14, until open. The door is moved by cables winding on or off a cable drum 12 driven through a drive belt 16 by an electric motor 18. The motor is on a carriage mounted at 30 to allow the drive belt to be slackened to remove drive from the drum 12.

Control circuits 20 for the apparatus are described.

17 Claims, 4 Drawing Sheets

APERTURE CLOSURES

The present invention relates to aperture closures and in particular to control arrangements for controlling aperture closure members such as doors.

In many situations, particularly industrial premises, it is known to provide electrically driven doors to allow remote operation of the doors. It is an object of the present invention to provide an improved control arrangement for aperture closure members of this general nature.

The invention provides an aperture closure member control arrangement comprising electric drive means operable to drive the closure member, battery supply means operable to power the control arrangement and comprising a plurality of rechargeable cells, and power supply means operable to supply recharging current to the cells, there being switch means associated with the battery supply means and operable to connect the cells across the power supply when the cells are being charged, and to connect the cells in series with each other and with the drive means when powering the drive means.

The term "cell" is used because the "cells" can be connected together in series to form a battery providing a higher voltage than the cells can provide individually, but it is to be realised that each cell need not itself be a single voltaic cell, but could be in the form of a battery of several voltaic cells. Thus, the term "cell" is being used to refer to a module of one or more voltaic cells.

Preferably each cell of the battery supply means comprises a first terminal of a first polarity and a second terminal of a second polarity, the terminals of the first cell being connected across the power supply means during recharging, and the or each other cell having associated switch means operable to connect the first terminal either to the first terminal of the first cell during charging, or to the second terminal of another cell to form a series connection therewith when powering the drive means, and to connect the second terminal to the power supply means during charging, the supply to the drive means being taken from the second terminal of a cell.

Preferably there are at least three cells connectable either across the power supply during charging, or all in series while supplying the drive means. The switch means is preferably operable to connect the drive means between the first terminal of the first cell and the second terminal of a selected cell, whereby the drive voltage is selectable.

The power supply means preferably comprises a power supply providing regulated charging current. The charging current is preferably provided as the collector-emitter current of an output transistor, regulation being achieved by adjustment of the base current. The collector-emitter current of the output transistor is preferably in series with a resistor, the resistor and base being shunted by a control transistor, whereby base current of the output transistor can be shunted by operation of the control transistor in dependence on the current flowing in the resistor. The base of the control transistor is preferably connected to sense the output of the power supply, whereby to shunt base current away from the output transistor, thereby turning off the transistor in the event the output is shorted.

The power supply preferably provides voltage regulated charging current. The charging current may be adjusted according to the output voltage to control the output voltage. The output voltage is preferably applied to the base of a transistor circuit which supplies base current to the output transistor. The transistor circuit preferably compares the output voltage with a reference voltage and adjusts the base current in accordance therewith.

The invention also provides an aperture closure member control arrangement comprising drive means operable to drive the closure member, and control means operable to count operations of the arrangement and to modify operation in accordance with the count.

Preferably the drive means provides fast and slow modes for closing the closure member, the control means inhibiting fast closure after a predetermined numbers of counts has been reached. Preferably closure is effected by a manual operation which is required to be more complex after a predetermined number of counts has been reached. Operation to open the closure member is preferably maintained without modification in accordance with the count.

The control means may effect a count of operations to determine when maintenance of the arrangement is required, the control means providing a manually detectable signal upon each operation after maintenance has been determined to be required.

The control means may be responsive to a reset sequence of manual operations to reverse the said modification to operation.

The invention also provides an aperture closure member control arrangement comprising drive means operable to drive the closure member by means of a rotating drive member and a drive belt, the drive means being mounted on a carriage movable to bring the drive member and belt into and out of engagement.

The carriage is preferably manually movable. The carriage may be mounted to be pulled or released to bring the drive member and belt into and out of engagement. The carriage may be provided with an elongate member by which the carriage position may be controlled. The elongate member may be a cable whose position is manually controlled by an over-centering mechanism by which the cable may be tensioned to engage the drive member and belt, and retained under tension.

The invention also provides an aperture closure member control arrangement comprising drive means operable to drive the closure member, and monitoring means operable to monitor variations in the load on the drive means, the monitoring means comprising signal generating means operable to provide first and second signals which vary in response to variations in the load, comparison means operable to compare the first and second signals, and time constant means operable to provide time constants which govern the responses of the signal generating means, the time constant means causing the second signal to be governed by a longer time constant than the first to cause the comparison result to vary in accordance with the rate of change of the load, and wherein limit means are provided to prevent the second signal passing a preset value.

Preferably the limit means provides an upper limit for the second signal. The preset value may be a voltage level defined by a tap in a potential divider. The second signal is preferably provided to the comparison means at a point connected to the potential divider tap by means of a diode, whereby the second signal is prevented from passing the voltage at the tap by more than the forward bias voltage of the diode. Preferably at least one component of the potential divider is adjustable to allow the preset value to be changed.

Preferably the arrangement monitors motor current of an electric motor.

Embodiments of the present invention will now be described in more detail, by way of example only, and with reference to the accompanying drawings, in which.

OVERVIEW

The apparatus to be described below is described in use with a closure arrangement in the form of an electrically driveable door which is articulated to allow the door to have a closed, vertical condition, and an open condition in which the door extends generally horizontally over the opened aperture. The arrangement could also be used with a door which remains in the same vertical plane when open or closed, and which therefore need not be articulated.

Mechanical System

Figure 1:
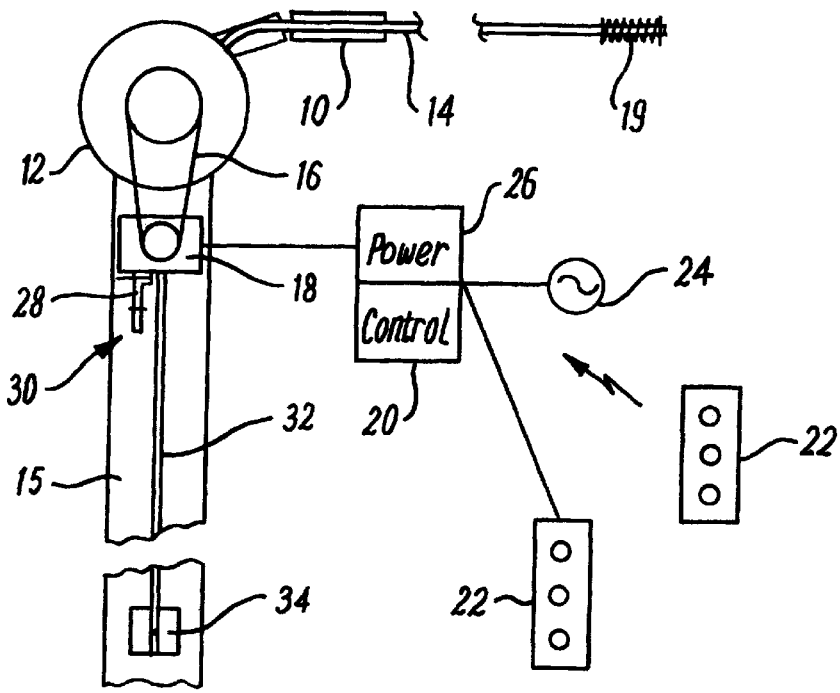
FIG. 1 is a highly schematic side elevation of a door closure arrangement incorporating apparatus according to the present invention.
Figure 2:
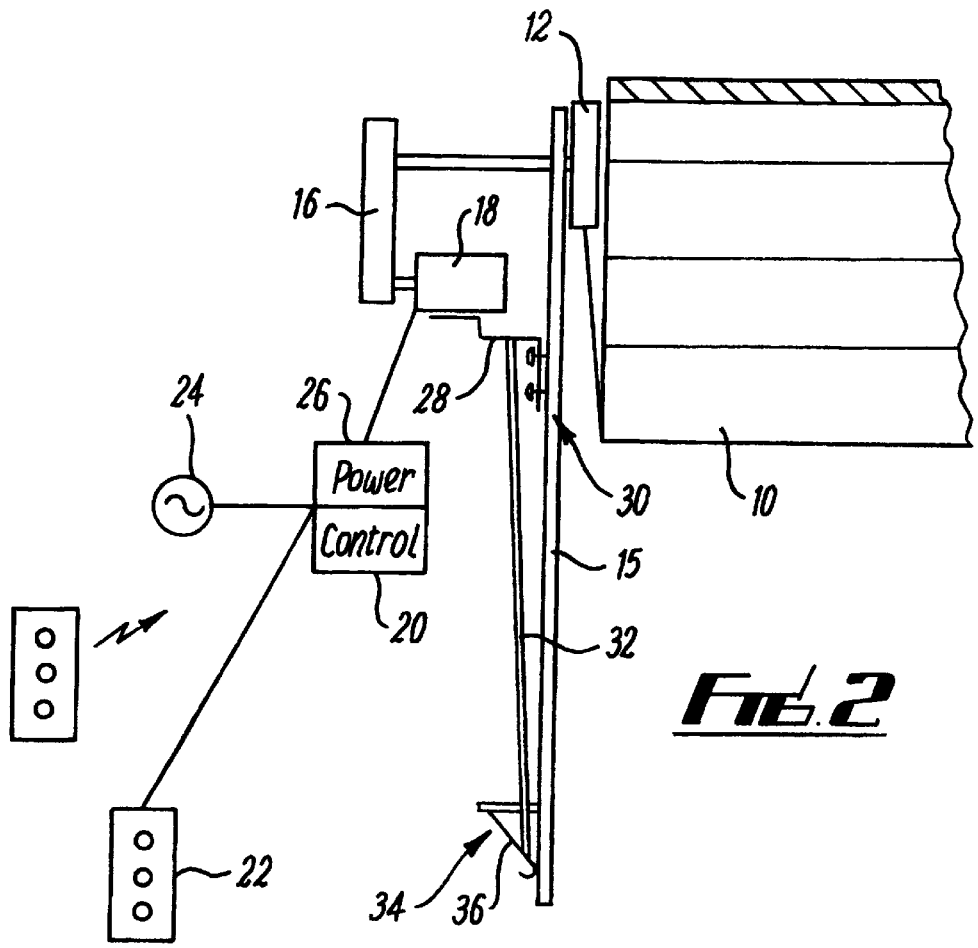
FIG. 2 is a partial and highly schematic rear elevation of the apparatus of FIG. 1.

FIGS. 1 and 2 show the sliding door mechanism schematically, with the door partially open. The door 10 is in the form of a series of horizontal slats, each articulated to the slat above and below to allow the door 10 to move from a closed position in a vertical plane, along between tracks 14 provided to either side of the door 10, until occupying an open position in a generally horizontal plane between the tracks 14. The horizontal leg of the tracks 14 is shown in FIG. 1. The tracks have a vertical leg down a support post 15 but are not shown in FIG. 2, in the interests of clarity.

Figure 4:
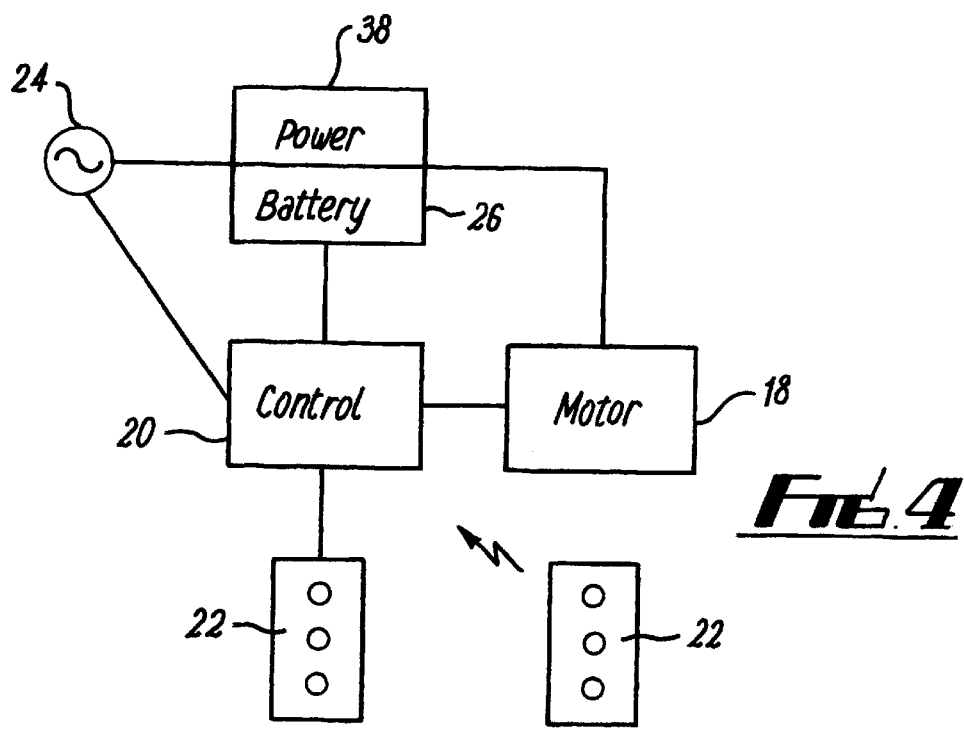
FIG. 4 is a schematic block diagram of control arrangements for the apparatus of FIGS. 1 to 3.

The door is moved by cables winding on or off a cable drum 12. The drum 12 can be driven through a drive belt 16 and driven pulley 17 by an electric motor at 18 and drive pulley 19. The motor 18 is under the control of a control circuit 20 which in turn is controlled by a manual control panel 22 and powered by mains supply 24 or back-up batteries 26. The panel 22 may be connected by umbilical cable to the circuit 20, or may be a remote control unit. Both alternatives are illustrated in FIGS. 1, 2 and 4.

Appropriate operation of the controls on the panel 22 instructs the control circuit 20 to operate the motor 18 to turn the drum 12 in the appropriate direction to drive the door 10 from the closed position to the open position, or from the open position to the closed position.

Belt drive arrangements such as that shown in FIGS. 1 and 2 are known to require periodic adjustment, for instance to take up any slack caused by stretching of the belt 16. In accordance with the invention, provision for this is by mounting the motor 18 on a carriage 28 which is in turn slidably mounted at 30 on the post 15 to allow the carriage 28 to slide up or down. The slidable mounting may be in the form of a track attached to the post 15, along which the carriage can slide. Other alternatives could be used, such as a slidable mounting in the form of pegs (preferably on the post 15) slidable along slots (preferably in the carriage). The arrangement used should allow movement to change the tension in the drive belt 16, to allow sufficient slippage to prevent the motor 18 driving the drum 12. While up and down motion is described herein, it will be apparent that any direction of motion could be used which causes the motor to disengage from the drive belt.

The position of the carriage 28 is controlled by a cable 32 and lock arrangement 34. Pulling down on the cable 32 will pull the carriage 28 down and engage the motor 18 with the drive belt 16. Releasing the cable 32 will allow the carriage 28 to ride up, removing tension from the drive belt 16 and thus preventing the motor 18 from driving the drum 12.

Figure 3:
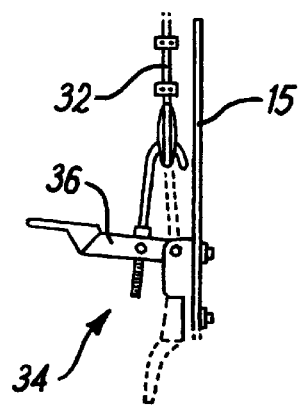
FIG. 3 is a rear elevation on an enlarged scale of part of the apparatus of FIG. 2.

The lock arrangement 34 includes an over-centering lever 36 to which the cable 32 is attached and by means of which the cable can be pulled down to snap the lever 36 over-centre to the position shown in broken lines (FIG. 3) in which the cable 32 is held under tension, pulling the motor 18 down. Manually pulling the lever 36 up, over-centre, allows the cable tension to be released, disabling the door from further motor operation. This arrangement provides a security feature, enabling authorised personnel to disable the arrangement, thus effectively locking the door in the current position (usually the closed position). Again, movement of the lever 36 could be in other orientations, with appropriate routing of the cable 32.

Adjustment of the tension achieved in the cable 32 may be provided by an appropriate screw-threaded or other adjustment between the cable 32 and the lever 36.

Resilient members such as springs 19 are provided at the ends of the tracks 14. These assist in starting movement of the door 10 from the open position, to overcome mechanical problems such as friction, motor stalling and the like. They also keep the cables taut on the drum 12. The door abuts the springs 19 and compresses them as the door moves to the open condition. Further details of this are set out below in connection with the motor current tracking arrangement.

Operation of the door may be fast or slow. Preferably the door moves fast until approaching the fully closed or fully open position, and then moves slowly.

Electrical Arrangements

FIG. 4 shows the electrical circuits of the arrangement in schematic block diagram form.

Operation of the motor 18 is under control of a control circuit 20 which is powered from mains 24 or by back-up batteries 26. A power supply circuit 38 also allows the batteries 26 to be charged. The control panel 22 includes appropriate manual controls, preferably at least a minimum of three controls to instruct the door to open, to instruct the door to close, and to instruct the door to stop (for instance in emergency).

Maintenance and Account Features

The basic operation of the control circuit 20 is to respond to activation of the OPEN control on the panel 22 to drive the motor 18 to open the associated door, and to reverse the direction of the motor 18 to close the door when the CLOSE control is activated. A STOP control may also be provided for emergency use.

Each operation of the door is counted by the circuit 20, and the manner in which the arrangement functions is modified in accordance with the count.

First, the circuit 20 (which may be microprocessor based, or use discrete components, or a combination of both) stores a value for a predetermined count and allows the door operation to continue normally until that count has been reached. Thereafter, fast door operation is inhibited so that the door can only operate at a relatively slow speed. This predetermined count can be set to correspond to a few weeks normal usage. This facility would be used by an installer when the arrangement is first installed. By disabling fast operation after a few weeks, the arrangement would appear to the user to be malfunctioning once the predetermined count has been reached. The user is then likely to contact the installer for further information or to complain. This allows the installer to ensure that the installation has been paid for, before either attending to reset the count (or disable that facility), or issuing the user with a code sequence of control operations in order to disable that function.

In similar manner, the control circuit 20 continuously counts operations of the door 10 in order to monitor maintenance intervals. A further predetermined count is stored within the circuit 20, corresponding to normal usage over a period normally of several months and corresponding to a typical service interval. When the second predetermined count is reached, the operator can be provided with a signal, such as a light, sound or other signal, to alert the operator that maintenance is desirable or required. The circuit 20 can be arranged (such as by programming of a microprocessor or the like) to reset the count once a specified control sequence has been executed on the panel 20. This sequence would normally be known only to the service or maintenance engineer.

Battery Charging Supply

Figure 5:
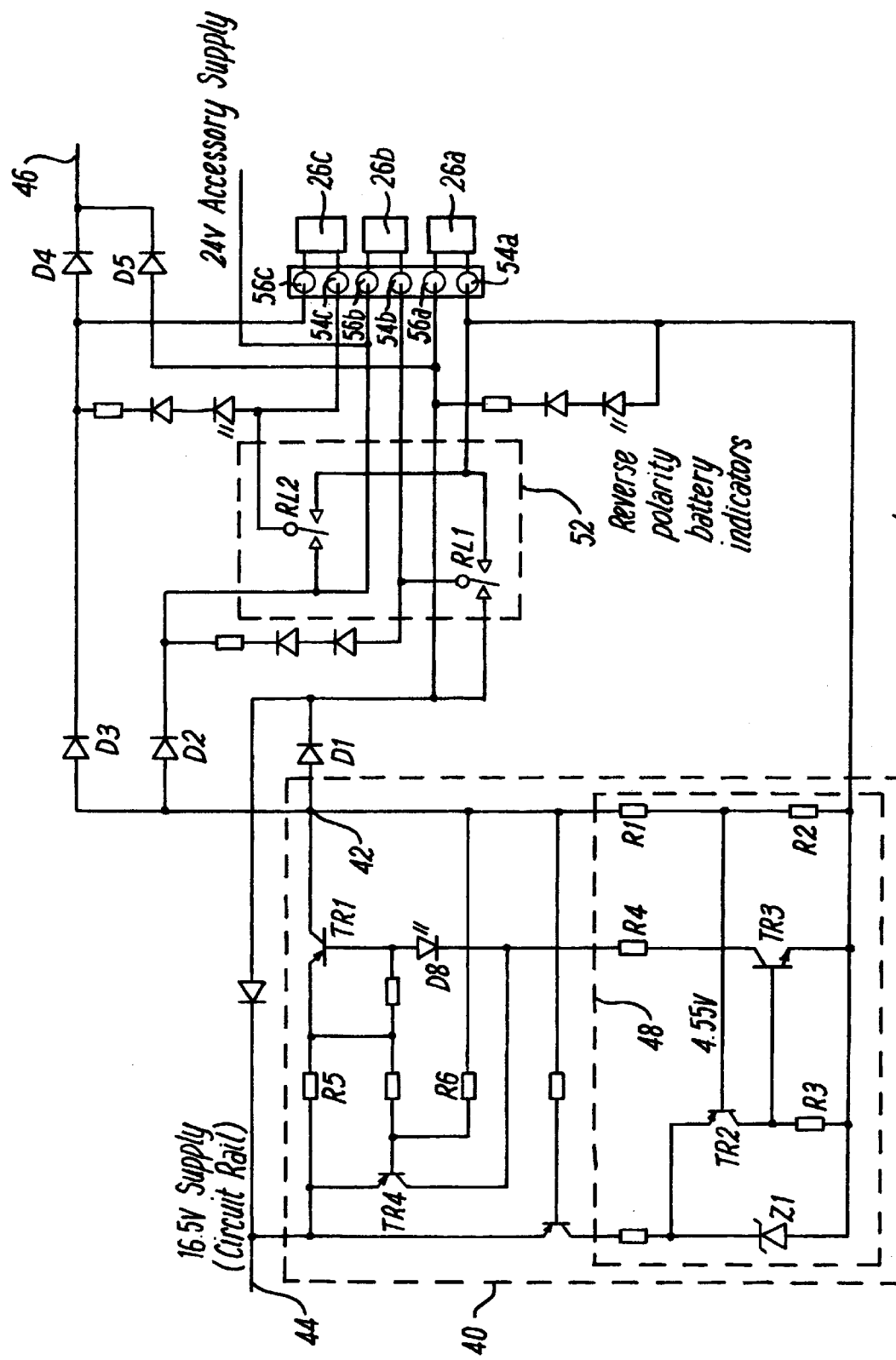
FIG. 5 is a simplified circuit diagram of a battery charging arrangement within the circuit of FIG. 4.

FIG. 5 shows those components of the circuit 20 involved in providing charging current for the back-up batteries 26.

A power supply 40, toward the left of FIG. 5, provides a regulated supply at point 42 when connected to a rectified mains supply at 44. The output voltage at 42 is provided to the batteries through diodes D1,D2,D3, as will be described.

Charging current is provided as collector-emitter current of transistor TR1 which provides current controlled by its base current. Base current can be controlled to provide voltage regulation by means of an arrangement indicated at 48. Resistors R1, R2 are in series between point 42 and ground to provide a potential divider tapped to the base of transistor TR2. The emitter of TR2 is held at a reference voltage by zener diode Z1. The collector of TR2 is connected to ground through a bias resistor R3, and to the base of TR3. The emitter of TR3 is connected to ground, and the collector is connected to the base of TR1, through series resistor R1 and annunciator diode D8.

Consequently, if the voltage at point 42 begins to rise, the base voltage of TR2 will rise. This reduces emitter-collector current of TR2 which reduces the base current of TR3, which in turn reduces the base current of TR1. This tends to return the voltage at 42 to the original level. Similarly, if the voltage drops, the circuit just described will tend to return the voltage to the original level.

Current limiting is provided by transistor TR4 and associated resistors, as follows. A resistor R5 is provided in series with the emitter of TR1 and the voltage across RS is applied across the base emitter junction of TR4. The collector of TR4 is connected to the collector of TR3 through R4.

TR4 provides a clamp (that is, an upper limit) on current supplied at 42, in the following manner. If the current rises sufficiently to cause the voltage across R5 to be high enough to turn on TR4, base current to TR1 will then tend to shunt through TR4 to the supply at 44, rather than passing through TR1, until output current is returned to the original value.

TR4 also provides protection against short circuit. This is achieved by R6 from the base of TR4 to point 42. Thus, if point 42 is shorted to ground, TR4 will turn fully on, shunting the base current of TR1, away from the base. TR1 will turn off. This arrangement can also provide trickle charge current to a fully discharged battery. Protection against reverse polarity connection of a battery is provided in similar fashion.

Battery Switching Arrangements

Toward the right of FIG. 5, connections are shown for three batteries 26a,b,c. Each battery has positive and negative terminals which can be connected together in various arrangements by a switch arrangement generally at 52.

It is to be appreciated that when the supply 40 is operating (being supplied by mains) the batteries 26 will not supply the motor 18 but may be charged by the supply 40. When the supply 40 fails (particularly when mains is removed) the batteries 26 can then power the motor 18.

The three batteries 26 include a first battery 26a having a negative terminal 54a permanently connected to ground and a positive terminal 56a permanently connected to the point 42 through diode D1.

The second battery 26b has a negative terminal 54b connected through a relay RL1 either to the positive terminal of battery 26a, or to ground (the negative terminal of battery 26a), according to the setting of RL1.

The positive terminal of the second battery 26b is connected to point 42 through diode D2 and can be connected through relay RL2 to the negative terminal of battery 26c. In the other position of RL2, the negative terminal of battery 26c is connected to ground. The positive terminal of battery 26c is connected to point 42 through diode D3.

Accordingly, appropriate setting of the relays RL1,RL2 allows the batteries 26 to be connected either across the supply 40 (between ground and point 42) to allow them to be charged together, effectively in parallel, but isolated from each other by diodes D1,D2,D3. This provides efficient charging while power supply 40 is operating normally. When power supply 40 fails (because mains has failed), the relays RL1,RL2 trip to the position shown. This connects batteries 26a, 26c in series, as follows. With relays RL1,RL2 in the positions shown in FIG. 5, the three batteries 26a, 26b,26c are in series, providing three times the battery voltage to the output at 46, from the positive terminal of battery 26c, through diode D4. A tap of twice the battery voltage is available from the positive terminal of battery 26b for use elsewhere in the control arrangement. If RL2 then switches to the other position, batteries 26a,26c are then in parallel (but isolated by diodes), providing lower voltage (slow speed) drive to the motor through diodes D4,D5, but batteries 26a, 26b remain in series, providing the tap at twice the battery voltage.

Motor Current Sensing

Figure 6:
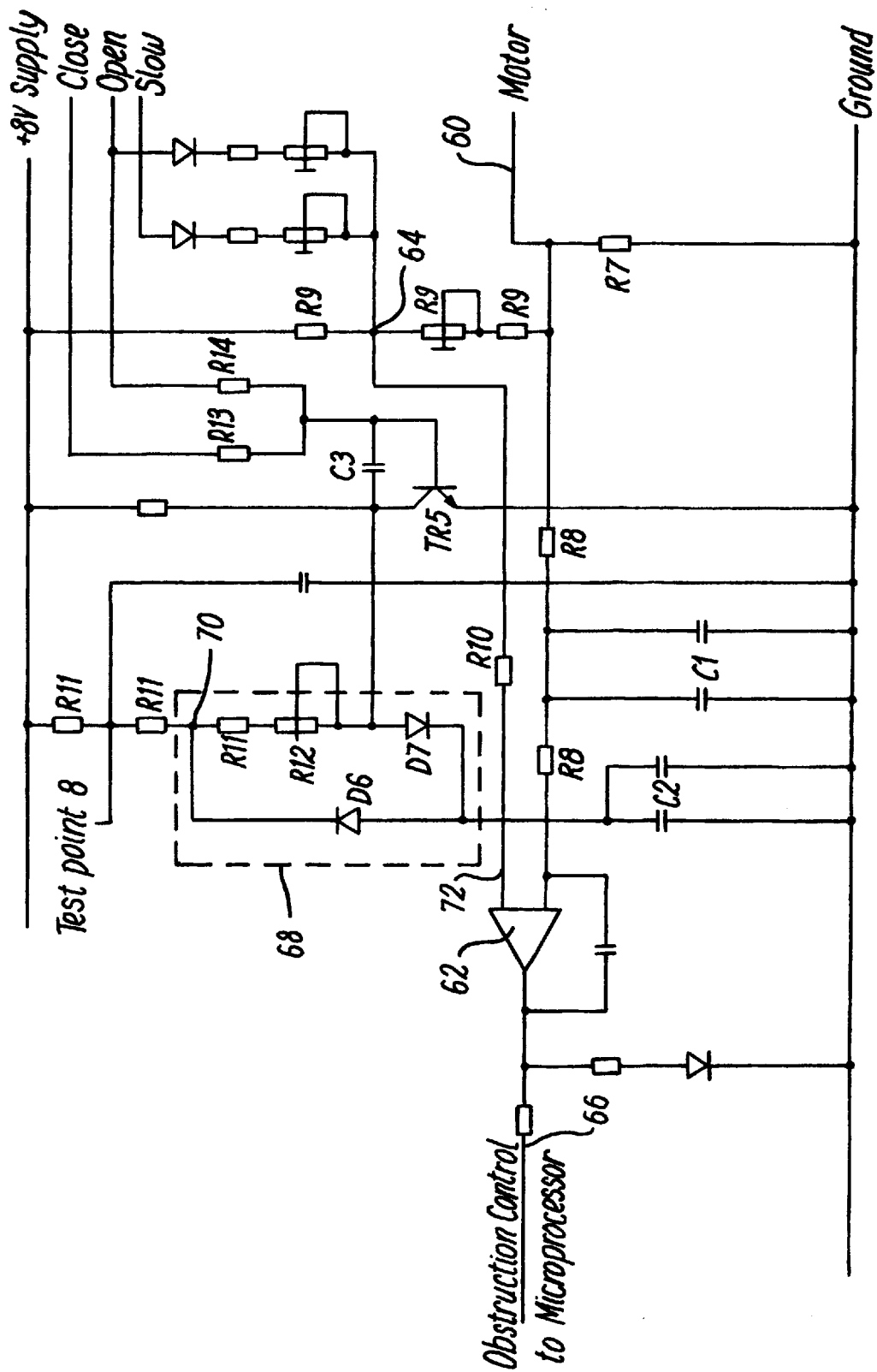
FIG. 6 is a simplified circuit diagram of a motor current tracking circuit within the arrangement of FIG. 4.

FIG. 6 illustrates a circuit used to monitor the load on the motor 18, by monitoring the motor current by means of the voltage across a resistor R7 in series with the motor (at 60).

Monitoring is provided by a comparison technique described in our British Patent No. 2287369B. The voltage across R7 (representing the current through the motor 18) is applied to one terminal of comparator 62 through series resistors R8, the common terminal of which is connected to ground through capacitors C1 to provide a time constant (such as 110 milliseconds) which causes a time delay in passing changes in the voltage across R7 to the input of the comparator 62. This part of the circuit also provides some RC filtering of transients.

The second input 72 of the comparator 62 is also provided with a voltage ultimately derived from R7, but modified as follows. The voltage across R7 is applied to a potential divider formed by resistors R9 in series, one of which is variable to change the voltage offset between the potential divider tap 64 and the voltage across R7. The voltage at the tap 64 is applied to the second input of the comparator 62 through a series resistor R10 and that input is connected to ground through capacitors C2 to provide a second time constant (such as 680 milliseconds) which is longer than the time constant provided by R8,C1.

Consequently, in normal use, variations in the motor current will cause the voltage across R7 to vary and the voltage at the two inputs of the comparator 62 will track each other but remain at a potential difference set by the potential divider R9. However, if the motor current rises suddenly (for instance due to an obstruction), the voltage applied to the comparator 62 through R8,C1 may rise more rapidly than the tracking voltage through R10,C2 (by virtue of the time constant differences), causing the comparator output to change and signal at 66 that an obstruction or other abnormality has occurred. Sensitivity is determined by the choice of voltage offset and time constants. Obstruction detection is most important during high speed closing. When the door is opening, or moving slowly, inputs OPEN or SLOW go high, putting more current through the lower part of the offset potential divider R9, thus reducing sensitivity by increasing the offset voltage.

In this embodiment, an additional facility is provided by a clamping arrangement at 68. This includes series resistors R11 and a variable resistor R12, also in series, connected to the collector of TR5, the emitter of which is connected to ground. Two control lines labelled CLOSE and OPEN allow the control circuit 20 to turn TR5 on when the door is being opened or closed, by applying base current through R13 or R14.

The potential divider R11,R12 is tapped at 70 and connected to the tracking terminal 72 of the comparator 62 through diode D6. The tap 70 forms a reference voltage which would be set higher than the expected peak value at 72 while the door is opening or closing. However, if the voltage at 72 was to rise above the voltage at 70 by more than the forward bias voltage of diode D6, diode D6 would turn on and prevent the voltage at 72 rising any further, clamping that voltage to the level set by the tap 70 and the forward bias diode voltage.

This facility provides an upper limit to the voltage at 72 and provides a number of advantages. In particular, when the door is approaching the fully open position, both inputs OPEN and SLOW will be high, and the sensitivity will be much reduced. This could give rise to very high motor currents, as the springs 19 begin to be compressed, providing resistance to the motor and tending to cause the motor current to rise steadily, not fast enough to trigger the comparator. Motor current will continue to rise until the voltage at 72 becomes clamped through diode D6, the comparator 62 signals an abnormality and the motor is turned off. The point at which this occurs can be set by adjustment of R12 and this in turn determines the degree to which the springs 19 will be compressed before the motor is turned off. Thus, the force with which the springs 19 are pushing the door 10 away from the fully open position is set by R12. During installation, R12 can be adjusted so that when the door 10 is fully open, the springs 19 provide adequate force to overcome initial stalling or inertia when the door is to close, as described above, and also to keep cables taut.

The clamping provided by diode D6 also provides an additional safety feature in that if a "soft" obstruction is encountered, motor current might not rise sufficiently quickly for the time constant circuits to signal an obstruction in the manner described above, but if the door continued to move against an obstruction for this reason, the clamping of terminal 72 would eventually function and cause the obstruction to be signalled.

Protection against motor start transients is provided as follows. Initially, capacitor C2 will be fully charged through resistors R9,R10 and diode D7 prior to operation beginning. When OPEN or CLOSE go high, to commence door movement, transistor TR5 begins to turn on. The speed of TR5 turning on is controlled by the time constant set by R13 or R14 and the capacitor C3 across the base-collector junction of TR5. This limits the rate at which TR5 turns on, thus allowing motor start transients to decay (within about 220 ms). As TR5 turns on, D6 becomes forward biased, ensuring capacitor C2 will discharge significantly to commence the tracking operation described above. The overall effect is to prevent the comparator changing state until transients have decayed, but to allow tracking to begin sooner than the time constant R10,C2 (about 680 ms) would allow.

Many variations and modifications can be made to the apparatus described above, without departing from the scope of the invention. In particular, component values and technologies can be widely varied in accordance with the normal factors known to the skilled person.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. An aperture closure member control arrangement comprising electric drive means operable to drive the closure member, battery supply means operable to power the control arrangement and comprising a plurality of rechargeable cells, and power supply means operable to supply recharging current to the cells, there being switch means associated with the battery supply means and operable to connect the cells in parallel across the power supply when the cells are being charged, and to connect the cells in series with each other and with the drive means when powering the drive means, each cell of the battery supply means comprising a first terminal of a first polarity and a second terminal of a second polarity, the terminals of a first cell being connected across the power supply means during recharging, and the or each other cell having associated switch means operable to connect the first terminal either to the first terminal of the first cell during charging, or to the second terminal of another cell to form a series connection therewith when powering the drive means, and to connect the second terminal to the power supply means during charging, the supply to the drive means being taken from the second terminal of a cell selectable during operation of the arrangement to provide a selectable drive voltage.

2. An arrangement according to claim 1, comprising a power supply providing regulated charging current.

3. An arrangement according to claim 2, wherein the regulated charging current is provided as the collector-emitter current of an output transistor, regulation being achieved by adjustment of the base current.

4. An arrangement according to claim 3, wherein the collector-emitter current of the output transistor is in series with a resistor, the resistor and base being shunted by a control transistor, whereby base current of the output transistor can be shunted by operation of the control transistor in dependence on the current flowing in the resistor.

5. An arrangement according to claim 4, wherein the base of the control transistor is connected to sense the output of the power supply, whereby to shunt base current away from the output transistor, thereby turning off the transistor in the event the output is shorted.

6. An arrangement according to claim 3, wherein the power supply provides regulated voltage and charging current.

7. An arrangement according to claim 6, wherein the output voltage is applied to the base of a transistor circuit which supplies base current to the output transistor.

8. An aperture closure member control arrangement comprising drive means operable to drive the closure member, and control means operable to count number of times the arrangement has been operated to open or close the aperture closure member and to modify operation in accordance with the count.

9. An arrangement according to claim 8, wherein the drive means provides fast and slow modes for closing the closure member, the control means inhibiting fast closure after a predetermined numbers of counts has been reached.

10. An arrangement according to claim 8, wherein closure is effected by a manual operation which is required to be more complex after a predetermined number of counts has been reached.

11. An arrangement according to claim 8, wherein the control means may be responsive to a reset sequence of manual operations to reverse the said modification to operation.

12. An arrangement according to claim 8, wherein the control means effects a count of operations to determine when maintenance of the arrangement is required, the control means providing a signal detectable by a user after maintenance has been determined to be required.

13. An aperture closure member control arrangement comprising drive means operable to drive the closure member by means of a rotating drive member and a drive belt, the drive means being mounted on a carriage movable to bring the drive member and belt into and out of engagement, the carriage having a mounting that allows free movement of the carriage during use of the arrangement, and there being control means which are manually operable to pull the carriage to a first position in which the drive member and belt are in engagement and to hold the carriage in said first position, or to release the carriage member to move to a second position in which the drive member and belt are out of engagement and the drive member is prevented from driving the drive belt.

14. An aperture closure member control arrangement comprising drive means operable to drive the closure member, and monitoring means operable to monitor variations in the load on the drive means, the monitoring means comprising signal generating means operable to provide first and second signals which vary in response to variations in the load, comparison means operable to compare the first and second signals, and time constant means operable to provide time constants which govern the responses of the signal generating means, the time constant means causing the second signal to be governed by a longer time constant than the first to cause the comparison result to vary in accordance with the rate of change of the load, and wherein limit means are provided to prevent the second signal passing a preset value.

15. An arrangement according to claim 14, wherein the limit means provides an upper limit for the second signal.

16. An arrangement according to claim 14, wherein the second signal is provided to the comparison means at a point connected to the potential divider tap by means of a diode, whereby the second signal is prevented from passing the voltage at the tap by more than the forward bias voltage of the diode.

17. An arrangement according to claim 16, wherein at least one component of the potential divider is adjustable to allow the preset value to be changed.

* * * * *